March 27, 1956     E. C. HADDOCK     2,739,624
SAW TABLE WITH GUIDE MEANS FOR PORTABLE ELECTRIC SAWS
Filed March 9, 1953
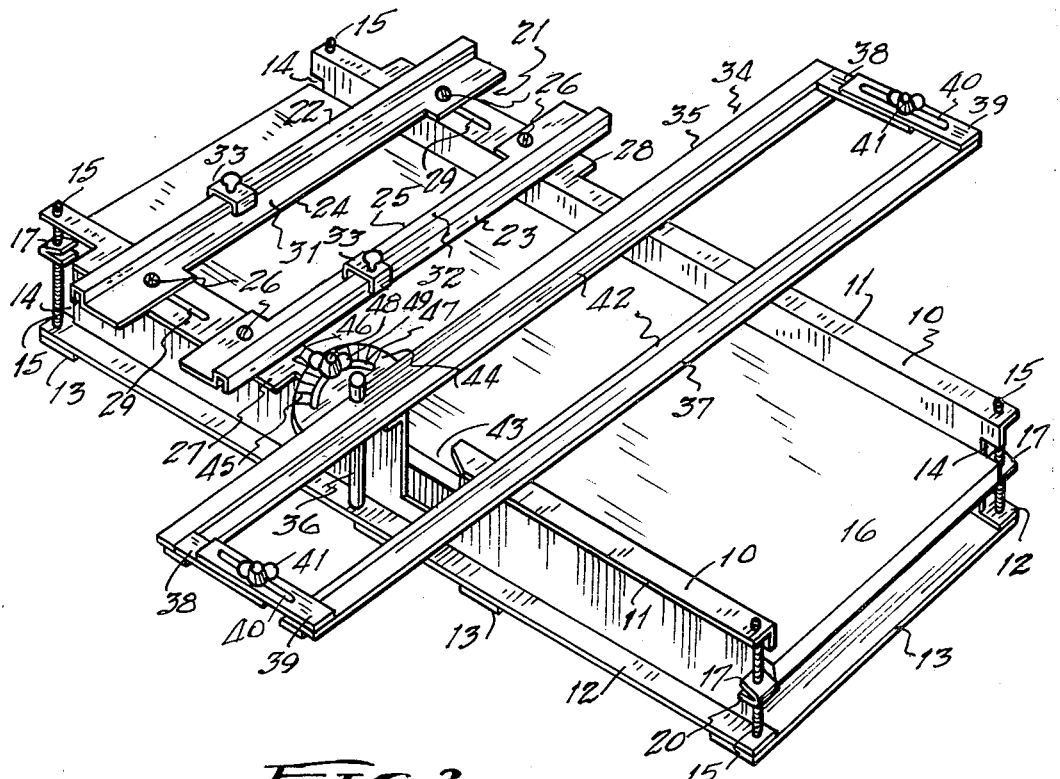
Earl C. Haddock
INVENTOR.
BY *Cecil L. Wood*
ATTORNEY

United States Patent Office 2,739,624
Patented Mar. 27, 1956

2,739,624

SAW TABLE WITH GUIDE MEANS FOR PORTABLE ELECTRIC SAWS

Earl C. Haddock, Fort Worth, Tex., assignor of fifty per cent to Cullen Y. Turner, Fort Worth, Tex.

Application March 9, 1953, Serial No. 341,036

4 Claims. (Cl. 143—6)

This invention relates to portable electric saw supports, and it has particular reference to adjustable tables for electric hand saws, and its principal object resides in the provision of a portable table having means thereon for operatively supporting a portable electric saw for ripping and mitering operations and affording a convenient device by which the saw can be readily and easily installed or removed at will and without altering the same to impair its usefulness in the usual operations.

An object of the invention is that of providing a portable tool by which virtually all sawing operations can be performed by mechanics in the woodworking crafts, such as carpenters, cabinet makers, and the like, while providing for the use of the saw in the usual manner for cut-off and ripping operations generally performed manually in different positions and locations.

A still further object of the invention resides in the provision of a saw table which is capable of vertical adjustments by which materials of different thicknesses can be sawed with extreme accuracy and ease, and by which a variety of angles can be cut, such as rafters, moulding, door and window trim, and the like.

Broadly, the invention contemplates the provision of a light, inexpensive tool adapted for ready portability but possessing features attainable only in expensive and heavy power equipment whose usefulness generally is limited to stationary projects and does not permit of the manual use of the saw as in cutting materials already placed in a structure.

While the foregoing objects are paramount, other and lesser objects will become manifest as the description proceeds, taken in connection with the appended drawings wherein:

Figure 1 is an isometric illustration of the invention showing the adjustable table, the rigid saw frame for ripping operations, and the adjustable miter frame.

Figure 2 is a side elevational view of the invention showing the positions of the electric saw in broken lines, and Figure 3 is a plan view of the invention showing the rigid saw frame, and the adjustable miter frame and illustrating, in broken lines, the operative positions of a portable electric saw.

Accordingly, therefore, the invention primarily comprises a frame which consists of a pair of side rails 10 which have outwardly extending longitudinal flanges 11 and 12 on the upper and lower edges. The side rails 10 are spaced apart and parallel and connected by cross-members 13 between the lower edges of the rails 10.

Each end of each of the rails 10 has a recess 14 formed therein between the upper and lower flanges 11 and 12, and a threaded shaft 15 is rotatably supported at its ends in the flanges 11 and 12 and is adapted to be rotated by a screw driver or wrench whereby to vertically move a saw table 16 supported between the rails 10. The table 16 has a bracket 17 at each corner and these brackets have interiorly threaded apertures therethrough and through which the shafts 15 are threaded to raise and lower the table 16, as desired. Obviously, a small crank, or the like, may be employed to rotate the shafts 15 to more rapidly actuate the same.

The saw table 16 is preferably of wood having a surface which is not generally injurious to the blades 18 of a circular saw 19, shown in broken lines in Figures 2 and 3, since the blades 18 come into contact with the table 16 many times in the course of ordinary use. It is desirable to provide a table 16 which can be changed from time to time, or replaced. The brackets 17 are formed with supporting transverse cleats 20 secured along the under surface of each end of the table 16 by screws, or other suitable device.

The side rails 10 provide guides for materials arranged along the table 16 to be operated upon by the saw 19, as in sawing or ripping a board longitudinally or with the grain of the wood, or in cutting the materials transversely, or squared, or in cutting miters and different angles. A stationary saw frame 21 is supported on the rails 10 near one end thereof, as shown in detail in Figures 1 and 3, on which the portable electric saw 19 can be supported so that the blade 18 thereof will operate in a plane parallel to the rails 10 in which position ripping operations can be performed.

The saw frame 21 comprises a pair of opposing rails 22 and 23 whose end flanges 24 and 25 are secured by screws 26 to extended portions 27 and 28 of the upper flanges 11 of the rails 10. A slot 29 is formed longitudinally of each of the members 27 and 28 through which the screws 26, securing the rail 22, are arranged whereby the latter can be adjusted toward or away from the opposite rail 23 to accommodate the base 30 of saws of different manufactures which vary in dimensions. Ways 31 and 32 are formed longitudinally of the rails 22 and 23 which slidably receive the opposing edges of the base 30 of the saw 19 to provide for adjusting the latter so that its blade 18 is properly spaced from the rails 10. A pair of clamps 33 are slidably attached to the rails 22 and 23 for detachably securing the saw 19 thereto.

A cut-off and miter frame 34 is arranged across the side rails 10 and is designed to slidably support the saw 19 so that the latter can be operatively moved across the table 16 at different angles with respect thereto, as in performing a squared cut-off or any of numerous angle cuts. The left rail 35 is pivoted on a stud 36 extending between the flanges 11 and 12 of one of the rails 10, as shown in Figure 1, and above the upper flange 11, and the rails 35 and 37 of the frame 34, being oppositely formed, are adjustably connected through brackets 38 and 39 which are formed with the rails 35 and 37 at each end, and the members 39 have slots 40 formed longitudinally thereof through which bolts 41 provide for lateral expansion and contraction of the frame 34 for accommodating saw bases 30 of different dimensions.

Each rail 35 and 37 of the miter frame 34 is also formed with a way 42 which slidably receives an edge of the base 30 of the saw 19 so that the latter can be freely moved longitudinally of the frame 34 and without being secured thereto, the blade 18 of the saw 19 operating transversely of the table 16 or at different angles with respect thereto. As the saw 19 is moved along the frame 34 the blade 18 is passed through an opening 43 in the rail 10 nearest the operator. The frame 34 can be accurately adjusted to different angles with respect to the work on the table 16 through the medium of a protractor 44 attached to the rail 35 and which has divisions 45 thereon capable of alignment with a pointer 46 on the top flange 11 of the rail 10 at which the frame 34 is pivoted. The protractor 44 has an arcuate slot 47 formed therein which slidably receives a stud 48 on which a winged nut 49 is threaded for fixing the frame 34 in its various adjusted positions, as indicated in broken lines in Figure 3.

In operation, therefore, the saw 19, which is of the conventional portable electric type commonly used by carpenters, and other similar craftsmen, is placed on the frame 21 and secured by the clamps 33 to insure rigidity for ripping operations. The saw is actuated through a switch which can be secured closed or operated by pressure of the user thereon during the period of operation, automatically opening the circuit when released. The width of the board to be cut is determined by the spacing of the blade 18 from either of the side rails 10.

Since it is necessary to move the saw 19 across the table 16 for cutting miters and different angles, the saw 19 is merely seated on the frame 34 and is unsecured so as to be freely moved therealong. When the saw 19 is to be used in sawing operations apart from the invention it can be readily removed therefrom.

It is apparent that various milling or dado operations can be performed by the use of suitable attachments for the saw 19 to replace the blade 18 thereof. Thus, the invention will provide a desirable substitute for a conventional bench saw which is usually expensive and impracticable for use outside of a shop.

Manifestly, the structure herein shown and described is capable of certain changes and modifications from time to time by persons skilled in the art, without departing from the spirit and intent of the invention or the scope of the appended claims.

What is claimed is:

1. In a table for portable electric saws, in combination with an electric saw, a frame comprising a pair of spaced side members having transverse connecting members between their lower edges, a table supported between said side members and means at each corner thereof for vertically adjusting the same, a stationary saw frame including saw supporting ways rigidly attached to the top edges of said side members whereby said stationary saw frame and said transverse members jointly provide rigidity to said saw table, an adjustable saw frame arranged on the said side members and pivoted at one side of said frame, and means for adjusting said frame to different angles across and above said table.

2. In a table for portable electric saws, in combination, a main frame having a pair of parallel spaced side rails, a saw table supported in said frame between said rails, means on said table connecting the same to said rails and providing for vertically adjusting the same, a saw supporting frame arranged on said rails and having a single locking connection and a pivotal connection at one of said rails, a protractor device on said saw supporting frame for adjusting the same to different angles with respect to said table, and means rigidly connecting said side rails on said main frame for supporting said saw in a stationary position for cutting longitudinally of said table, said means including longitudinal and transverse adjustment.

3. In a portable table for portable electric saws, in combination: a main frame comprising a pair of parallel spaced-apart channels, said channels including upper and lower outwardly facing flanges, transverse members connecting said lower flanges at their corners, transverse parallel ways connecting the upper flanges and forming thereby a rigid main frame, a saw table supported between said channels and having means thereon for adjusting the same vertically in the main frame, means on said ways for mounting a stationary saw in an adjustable but rigid position, said saw having its blade parallel to the inside face of said channels whereby either of said channels may act as a guide rail for ripping operations.

4. In a portable table for portable electric saws, in combination: a main frame comprising a pair of parallel spaced channels, said channels including upper and lower outwardly facing flanges, transverse members connecting said lower flanges at their corners, transverse parallel ways connecting the upper flanges and forming thereby a rigid main frame, a saw table supported between said channels and having means thereon for adjusting the same vertically in the main frame, means on said ways for mounting a stationary saw in an adjustable but rigid position, said saw having its blade parallel to the inside face of said channels whereby either of said channels may act as a guide rail for ripping operations; a miter frame pivotally connected to one of said channels and supported on the opposite rail above said table, a protractor device on said miter frame for adjusting same for angular saw cuts, and means for locking same in adjusted positions, said channel adjacent said pivotal connection including a cut-out section below said frame whereby a saw blade may pass through said frame for cutting a work piece employing said one channel and a guide rail.

References Cited in the file of this patent

UNITED STATES PATENTS

| 1,618,341 | Howland | Feb. 22, 1927 |
| 1,832,283 | Earhart | Nov. 17, 1931 |
| 1,842,630 | Rodning | Jan. 26, 1932 |
| 2,613,707 | Giles | Oct. 14, 1952 |
| 2,630,146 | Van Tuyl | Mar. 3, 1953 |
| 2,656,860 | Thayer | Oct. 27, 1953 |